April 14, 1970     K. HERZER ET AL     3,506,306
ADJUSTABLE HEAD REST FOR VEHICLE SEATS
Filed Feb. 27, 1968
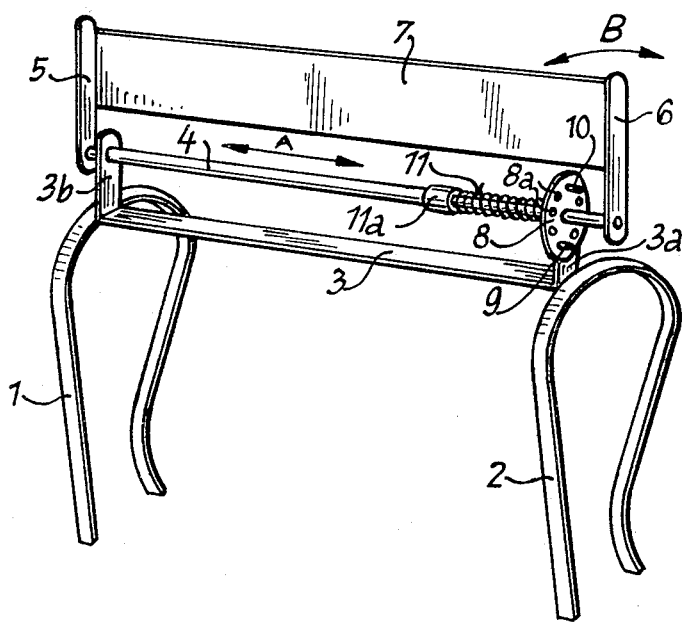

3,506,306
ADJUSTABLE HEAD REST FOR VEHICLE SEATS

Kurt Herzer, Karlsruhe-Durlach, and Wolfgang Mertens, Karlsruhe, Germany, assignors to Kurt Herzer, Karlsruhe, Germany, a company
Filed Feb. 27, 1968, Ser. No. 708,585
Claims priority, application Germany, Mar. 4, 1967, H 62,024
Int. Cl. A47c 7/38
U.S. Cl. 297—408                                            3 Claims

ABSTRACT OF THE DISCLOSURE

An adjustable head rest comprising a lower stationary portion on which there is mounted an upper rotary portion, complementary locking means secured to said portions and urged by spring means into an interlocking engagement to selectively lock said upper rotary portion in a desired angular position with respect to said lower stationary portion. The locking means are adapted to be disengaged by manually laterally shifting said upper portion overcoming the force of said spring means.

BACKGROUND OF THE INVENTION

Head rests for vehicle seats are well-known in the prior art. They may be either an appropriately shaped continuation of the back rest or may be made as rigid or adjustable accessories that may be inserted, clipped on or otherwise secured to the back of a vehicle seat.

Head rests of the adjustable type known heretofore have been manufactured with adjusting means disposed externally for manual operation.

For years it has been the trend in the automobile industry to avoid, for the safety of the occupants, externally located operating knobs and handles which are left uncovered by padding or upholstery.

OBJECTS AND SUMMARY OF THE INVENTION

It is an object of the invention to provide a head rest with lockable adjusting means having no exposed operating members liable to cause injury to occupants of the vehicle.

Briefly stated, there is provided a head rest comprising a stationary lower portion adapted to be secured to the back of a seat and an upper portion rotatably mounted on said lower portion and adapted to be locked in a plurality of desired angular positions. The rotary upper portion may be released from any of said locked positions by exerting a manual lateral pressure thereto overcoming the force of an internal spring and dislodging thereby a complemental locking means. While said lateral pressure is applied and the locking means is disengaged, the said upper portion is freely rotatable forward or backward. When the rotary head rest portion is set into its new desired angular position, the lateral manual force is removed, and said spring is free to shift the said upper portion laterally back into its normal position and to urge said locking means anew into its interlocking engagement rigidly securing the upper portion in its new angular position. All parts of the adjusting and locking mechanism are disposed inside the upholstery of the head rest.

The invention will be better understood and further objects as well as advantages will become more apparent from the ensuing detailed specification of a preferred exemplary embodiment taken in conjunction with the sole figure.

DESCRIPTION OF THE PREFERRED EMBODIMENT

Turning now to the sole figure there is shown in an isometric view a preferred embodiment of the inventive structure with the upholstery removed. A pair of spaced dependent resilient clips 1 and 2 are fixedly secured to opposed ends of a bracket 3 and are adapted to be snaped on the top of a back rest of a vehicle seat (not shown). The upwardly bent parallel portions 3a and 3b of bracket 3 are provided with aligned openings in which there is rotatably supported a shaft 4, the ends of which project beyond bracket portions 3a, 3b. The shaft 4 is axially displaceable with respect to bracket 3 to a limited extent in the direction of arrow A. To the projecting ends of shaft 4 there is fixedly secured a frame comprising lateral members 5 and 6 and an interconnecting flat cross member 7. Said frame is adapted to carry the upholstery or cushion for supporting the occupant's head.

To one end of shaft 4, adjacent to and externally of, bracket portion 3a there is keyed a disc 8 provided with a plurality of holes 8a arranged in a circular array about the shaft 4. To bracket portion 3a there are affixed a pair of outwardly directed pins 9 and 10 disposed at either side of shaft 4 and adapted to protrude through two opposed holes 8a in disc 8. It is thus seen that disc 8 on the one hand and pins 9, 10 on the other hand form complemental locking means, wherein one component (disc 8) is secured to shaft 4 and the other component (pins 9, 10) to bracket portion 3a. A compression spring 11 is disposed about shaft 4 and engages the inside of bracket portion 3a and a collar 11a rigidly affixed to shaft 4. Thus, normally, the compression spring 11 urges the shaft 4 and the frame 5, 6, 7 toward the left and, consequently, urges the apertured disc 8 into engagement with pins 9 and 10. As a result, shaft 4 and frame 5, 6, 7 constituting the upper portion of the head rest, are locked against rotation.

If now it is desired to release the frame 5, 6, 7 from its locked position, a manual force is exerted on the frame toward the right whereby the frame, together with shaft 4, is displaced toward the right against the force of spring 11 and as a result, the apertured disc 8 and pins 9, 10 separate. In this position the frame is freely rotatable backward or forward in the direction of arrow B. If now a new desired angular position for frame 5, 6, 7 is reached, the manual force (which is applied substantially normal to the direction of possible rotation of shaft 4) is removed allowing spring 11 to shift the frame and shaft 4 toward the left causing engagement of pins 9, 10 with a new pair of holes 8a in disc 8.

For the protection of occupants in the back seat, the locking mechanism 8, 9 and 10 or any other equivalent locking means may be arranged in such a manner that, upon a predetermined radial pressure against shaft 4 or against any release mechanism disposed within the upholstery, the locking means is released.

It is to be understood that the locking means 8, 8a, 9, 10 may be duplicated at the other (left) end of shaft 4. In such a case an apertured disc is affixed to shaft 4 adjacent to and inwardly of bracket portion 3b and the locking pins extend inwardly therefrom.

It will be further understood that instead of the described apertured disc 8 and engaging pins 9, 10, a pair of serrated discs may be used as complemental locking means, one of which is fixedly secured to bracket portion 3a while the other one is keyed to the shaft 4. The serrations face one another and normally they are in interlocking engagement. Or, a pair of crown gears may be used which operate similarly to serrated disc elements.

The head rest may be an independent unit which is securable to the top of the back rest or may be permanently affixed to the back. Further, the head rest may be secured to the back in such a manner that its height is adjustable to conform to the body length of the occupant.

That which is claimed is:

1. In a seat structure, a head rest of the type affixed to the back rest as a continuation thereof and adapted to be set into and locked in any of a plurality of angular positions, comprising:
   (A) a stationary lower portion,
   (B) an upper portion rotatably mounted on said lower portion and adapted to slide with respect thereto in a direction substantially normal to the plane of rotation of said upper portion,
   (C) a complemental locking means comprising one component affixed to said lower portion and another component affixed to said upper portion, said components adapted to assume a mutually interlocking position for preventing rotation of said upper portion from a desired angular position, said components also adapted to assume a disengaged position for allowing rotation of said upper portion into a desired angular position, one of said components being formed as a disc disposed substantially parallel to said plane of rotation and having a plurality of openings disposed in a circular array, another of said components including at least one pin disposed substantially normal to said plane of rotation and adapted to extend through selected ones of said openings and
   (D) resilient means urging said upper portion in a direction substantially normal to said plane of rotation and urging said components into said interlocking position, said resilient means adapted to be overcome by a manual force for displacing said upper member against the force of said resilient means in a direction substantially normal to said plane of rotation and for causing said components to assume said disengaging position.

2. In a seat structure, a head rest of the type affixed to the back rest as a continuation thereof and adapted to be set into and locked in any of a plurality of angular positions, comprising:
   (A) a stationary lower portion including a pair of upwardly extending spaced parallel bracket portions,
   (B) an upper portion rotatably mounted on said lower portion and adapted to slide with respect thereto in a direction substantially normal to the plane of rotation of said upper portion,
   (C) a shaft attached to said upper portion, said bracket portions rotatably and axially slidably supporting said shaft,
   (D) a complemental locking means comprising one component affixed to said shaft and another component affixed to one of said bracket portions adjacent said first named component, said components adapted to assume a mutually interlocking position for preventing rotation of said upper portion from a desired angular position, said components further adapted to assume a disengaged position for allowing rotation of said upper portion into a desired angular position and
   (E) a compression spring disposed about said shaft and urging said upper portion in a direction substantially normal to said plane of rotation and further urging said components into said interlocking position, the force of said spring adapted to be overcome by a manual force for displacing said upper member against the force of said spring in a direction substantially normal to said plane of rotation and for causing said components to assume said disengaged position.

3. A head rest as defined in claim 2, wherein one of said components comprises a disc affixed to said shaft adjacent one of said bracket portions, said disc having a plurality of openings disposed in a circular array and the other of said components comprises at least one pin affixed to the last named bracket portion and disposed substantially parallel to the axis of said shaft, said pin adapted to extend through selected ones of said openings.

References Cited

UNITED STATES PATENTS

| | | | |
|---|---|---|---|
| 3,186,763 | 6/1965 | Ferrara | 297—410 |
| 3,304,120 | 2/1967 | Cramer | 297—403 |
| 3,307,874 | 3/1967 | Wilson | 297—408 X |
| 3,328,082 | 6/1967 | Lilleso | 297—399 |

CASMIR A. NUNBERG, Primary Examiner

U.S. Cl. X.R.

297—397